(12) United States Patent
Melkote et al.

(10) Patent No.: US 8,654,732 B2
(45) Date of Patent: **\*Feb. 18, 2014**

(54) SYSTEM AND METHOD FOR ADVERTISING THE SAME SERVICE SET IDENTIFIER FOR DIFFERENT BASIC SERVICE SETS

(71) Applicant: Aruba Networks, Inc., Sunnyvale, CA (US)

(72) Inventors: Keerti G. Melkote, Saratoga, CA (US); Pradeep J. Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,976

(22) Filed: Jun. 5, 2013

(65) Prior Publication Data

US 2013/0265943 A1    Oct. 10, 2013

Related U.S. Application Data

(63) Continuation of application No. 13/757,308, filed on Feb. 1, 2013, now Pat. No. 8,483,169, which is a continuation of application No. 13/069,218, filed on Mar. 22, 2011, now Pat. No. 8,401,554, which is a continuation of application No. 11/305,910, filed on Dec. 19, 2005, now Pat. No. 7,948,953.

(51) Int. Cl.
*H04W 4/00* (2009.01)

(52) U.S. Cl.
USPC ...... 370/329; 370/328; 455/435.1; 455/435.2

(58) Field of Classification Search
USPC ............... 455/435.1–435.2; 370/328–329
See application file for complete search history.

(56) References Cited

U.S. PATENT DOCUMENTS

| | | |
|---|---|---|
| 7,181,211 B1 | 2/2007 | Phan-Anh |
| 7,948,953 B2 | 5/2011 | Melkote et al. |
| 8,401,554 B2 | 3/2013 | Melkote et al. |
| 8,483,169 B2 | 7/2013 | Melkote et al. |
| 2004/0125923 A1 | 7/2004 | See et al. |
| 2004/0246922 A1 | 12/2004 | Ruan et al. |
| 2004/0248610 A1 | 12/2004 | Chan |
| 2005/0068928 A1 | 3/2005 | Smith et al. |
| 2005/0201330 A1 | 9/2005 | Park et al. |
| 2006/0067290 A1 | 3/2006 | Miwa et al. |
| 2006/0165103 A1 | 7/2006 | Trudeau et al. |
| 2006/0223503 A1 | 10/2006 | Muhonen et al. |

OTHER PUBLICATIONS

U.S. Appl. No. 11/305,910, Non-Final Office Action, mailed Jan. 14, 2009.
U.S. Appl. No. 11/305,910, Final Office Action, mailed Jul. 21, 2009.
U.S. Appl. No. 11/305,910, Non-Final Office Action, mailed Dec. 10, 2009.
U.S. Appl. No. 11/305,910, Final Office Action, mailed Oct. 5, 2012.
U.S. Appl. No. 11/305,910, Notice of Allowance, mailed Jan. 20, 2011.
U.S. Appl. No. 11/305,910, Notice of Allowance, mailed Mar. 8, 2011.
U.S. Appl. No. 13/069,218, Non-Final Office Action, mailed Feb. 15, 2012.

*Primary Examiner* — Steven Lim
(74) *Attorney, Agent, or Firm* — Varun A. Shah

(57) ABSTRACT

According to one embodiment of the invention, a method comprises advertising services. The services are provided by different basic service sets, each basic service set having the same service set identifier (SSID). Thereafter, one of the basic service sets is selected.

26 Claims, 5 Drawing Sheets

SYSTEM AND METHOD FOR ADVERTISING THE SAME SERVICE SET IDENTIFIER FOR DIFFERENT BASIC SERVICE SETS

CROSS-REFERENCE TO RELATED APPLICATIONS; PRIORITY CLAIM; INCORPORATION BY REFERENCE

This application is a continuation of U.S. patent application Ser. No. 13/757,308 filed on Feb. 1, 2013, which is a continuation of U.S. patent application Ser. No. 13/069,218 filed on Mar. 22, 2011, now U.S. Pat. No. 8,401,554, which is a continuation of U.S. patent application Ser. No. 11/305,910 filed Dec. 19, 2005, now U.S. Pat. No. 7,948,953, the entire content of all of which is incorporated herein by reference. The applicant(s) hereby rescind any disclaimer of claim scope in the parent application(s) or the prosecution history thereof and advice the USPTO that the claims in this application may be broader than any claim in the parent application(s).

FIELD

Embodiments of the invention relate to the field of communications, and in particular, to a system and method for configuring a single access point (AP) to advertise the same Service Set identifier (SSID) for different Basic Service Set identifiers (BSSIDs).

GENERAL BACKGROUND

Over the last decade or so, many companies have installed networks with one or more local area networks in order to allow their employees access to various network resources. To improve efficiency, enhancements have been added to local area networks such as wireless access. Based on this enhancement, wireless local area networks (WLANs) have been and continue to be utilized by more and more companies.

Typically, a WLAN supports communications between number of wireless devices, such as wireless stations (STAs) and Access Points (APs), without any required line of sight for such communications. In general, each AP is wired to an Ethernet network and operates as a relay station by supporting communications between resources of the wired network and the wireless devices.

Currently, a WLAN features a set of wireless devices is referred to as a "Basic Service Set" (BSS). Multiples sets of wireless devices (BSSs) in direct communication with each other may be logically grouped together to form an "Extended Service Set" (ESS). The ESS is identified by one or more bytes forming an alphanumeric name that is commonly referred to as a "Service Set Identifer" (SSID). The purpose of the SSID is to help STAs find and connect to proper APs on a desired ESS.

Each AP may actively advertise the presence of a wireless network several times per second by broadcasting beacon frames that include the SSID for the ESS that the AP belongs to. STAs can discover APs by listening for these beacons. Alternatively, an AP may passively advertise the presence of a wireless network by waiting for one or more frames from a STA that is actively searching for access to a wireless network.

Currently, APs may be configured to simultaneously advertise access to multiple WLAN networks (BSSs) for a number of reasons such as security, quality of service (QoS) or ease of migration. There are a number of conventional configuration schemes that support simultaneous advertisement of services supported by different WLAN networks.

For instance, a first conventional configuration scheme involves the physical assignment of an AP for each BSS having different capabilities. Of course, this technique is costly to implement. In order to avoid such costs, conventional APs can be configured to advertise services associated with multiple BSSs, but only if every BSS is associated with a different ESS. In other words, the AP can advertise different SSIDs for each network type on a different BSSID. While this technique reduces the overall implementation costs from the first conventional configuration scheme, the presence of multiple SSIDs to users seeking access to the wireless network may cause confusion as to which network she or he should connect to.

Yet another conventional configuration scheme involves each AP advertising a single, unique SSID for each active BSS (i.e., transmitting a beacon including a single SSID). However, the AP is adapted to respond to Probe Requests for hidden SSIDs (i.e., Probe Requests for SSIDs that differ from the SSID exclusively broadcast in the beacons). This configuration deviates from current WLAN communications standards and assumes specific client behavior that may not be found in all network configurations.

None of the conventional configuration schemes is designed where an AP is configured as a virtual AP supporting multiple BSSs, each BSS having a different BSS identifier (BSSID) and each BSS advertising services that include the same SSID in order to reduce network complexity.

BRIEF DESCRIPTION OF THE DRAWINGS

The invention may best be understood by referring to the following description and accompanying drawings that are used to illustrate embodiments of the invention.

DETAILED DESCRIPTION

Figure 1:
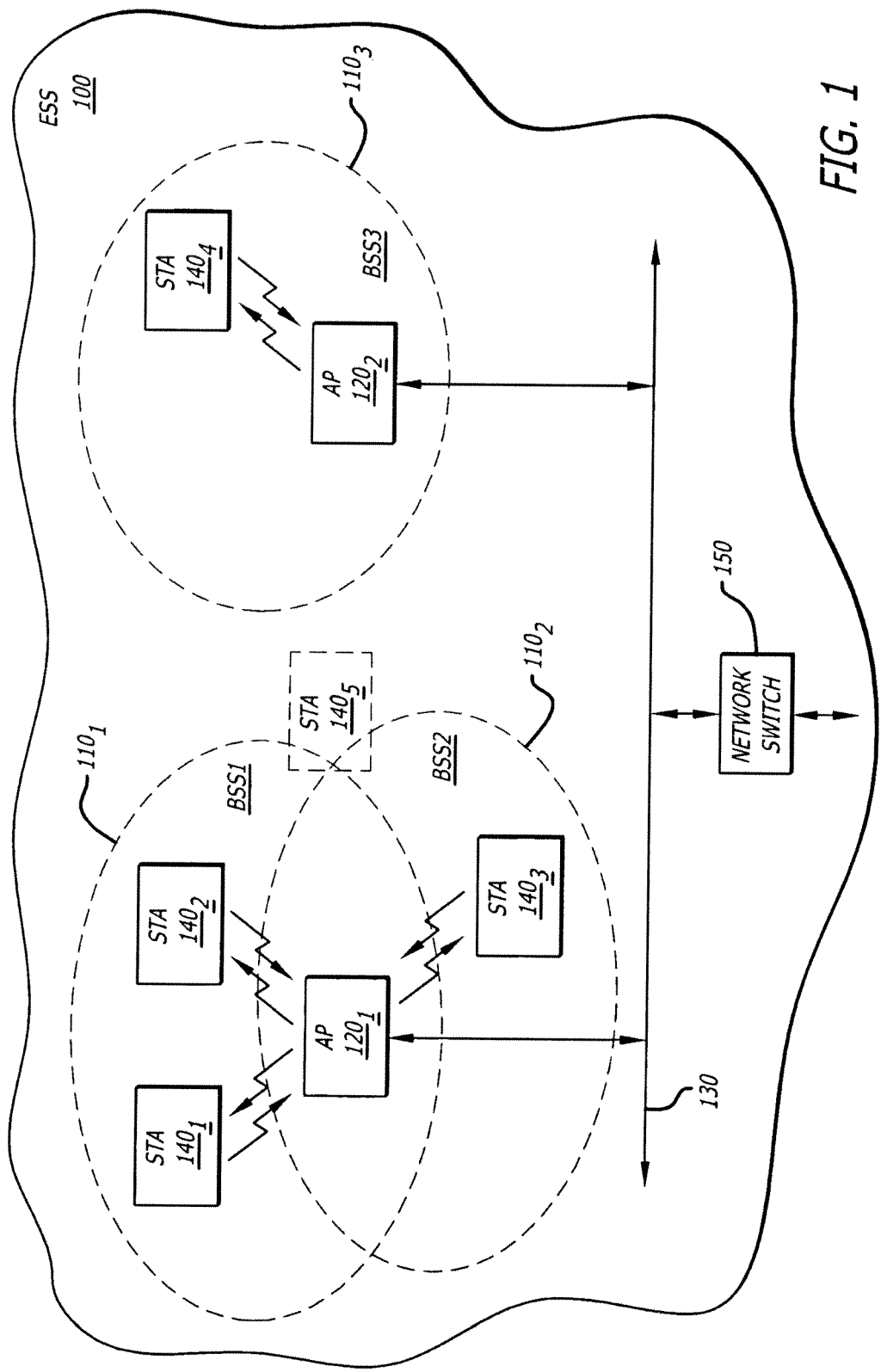
FIG. 1 is an exemplary embodiment of an Extended Service Set (ESS) in accordance with an embodiment of the invention.

Embodiments of the invention relate to a system and method for configuring multiple Basic Service Sets (BSSs) each with different Basic Service Set identifiers (BSSIDs) to advertise services including the same Service Set identifier (SSID) as an attribute. In general, in lieu of selecting the BSSID based on a uniquely assigned SSID as previously performed, the BSSID selection by a wireless device may be automatic (without need of user intervention) and based, at least in part, on at least one attribute of that BSS other than the SSID. For instance, the attribute may be the encryption profile of the BSS where different BSSs feature different encryption profiles (e.g., a Guest network "BSS1" supporting unencrypted communications and an Employee network "BSS2" supporting some sort of encryption protocol). Another attribute may be the particular type of Delivery Traffic Indication Message (DTIM), where voice-based networks will associate with a BSS advertising a higher DTIM in order to conserve phone battery life.

Herein, according to one embodiment, the invention may be applicable to a wireless network. According to one embodiment of the invention, the wireless network features an Extended Service Set (ESS) identified by a "Service Set Identifier" (SSID) being one or more bytes forming an alphanumeric name. The ESS is a logical grouping of multiple wireless networks (e.g., wireless local area networks) referred to as "Basic Service Sets" (BSSs), which are sets of wireless devices in direct communication with each other.

Herein, a wireless network may be configured in accordance with any current or future wireless communication protocols. Examples of various types of wireless communication protocols include, but are not limited or restricted to the following: Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); an IEEE 802.11g standard entitled "Wireless LAN Medium Access Control (MAC) and Physical Layer (PHY) specifications: Further Higher Data Rate Extension in the 2.4 GHz Band" (IEEE 802.11g, 2003) or the like.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, a "wireless device" generally includes hardware and/or at least one software module adapted to support wireless communications with another wireless device over the wireless network. Examples of a wireless device may include, but are not limited or restricted to an Access Point (AP), a wireless station (STA) or the like.

The software module is executable code such as an application, an applet, a routine or even one or more executable instructions stored in a storage medium. The storage medium may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a tape, a Universal Serial Bus "USB" flash drive), or the like.

A "profile" is a set of parameters defining the way a wireless device operates. "Information" is defined as data, address, control, management or any combination thereof. The information may be transmitted as a message, namely a collection of bits in a predetermined format such as a header and payload data format.

I. General Network Architecture

Referring to FIG. 1, an exemplary embodiment of an Extended Service Set (ESS) 100 in accordance with an embodiment of the invention is shown. In accordance with this embodiment of the invention, ESS 100 includes a plurality of interconnected Basic Service Sets (BSSs) $110_1$-$110_N$ (N≥1), namely a first BSS (BSS1) $110_1$, a second BSS (BSS2) $110_2$ and a third BSS (BSS3) $110_3$. Each BSS $110_1$, . . . , or $110_N$ includes at least one access point (AP) adapted for communication with one or more wireless stations (STAs).

As shown in detail, a first access point (AP) $120_1$ and a second access point (AP) $120_2$ are in communication with each other over an interconnect 130. According to one embodiment of the invention, interconnect 130 comprises a wired and/or wireless information-carrying medium that provides a communication path between APs $120_1$-$120_2$ and a network (Ethernet) switch 150 and other resources. Furthermore, AP $120_1$ is in communications with STA $140_1$-$140_3$ while AP $120_2$ is in communications with STAs $140_4$.

For the illustrative embodiment of ESS 100 of FIG. 1, BSS1 $110_1$ includes AP $120_1$ and STAs $140_1$ and $140_2$ while BSS2 $110_2$ includes AP $120_1$ and STA $140_3$. BSS3 $110_3$ includes AP $120_2$ and STA $140_4$. According to one embodiment of the invention, a STA constitutes any wireless device that processes information (e.g., portable computer, personal digital assistant "PDA", networked communication equipment such as a Voice-over-IP (VoIP) telephone, Wireless LAN Tag, etc.).

Figure 2:
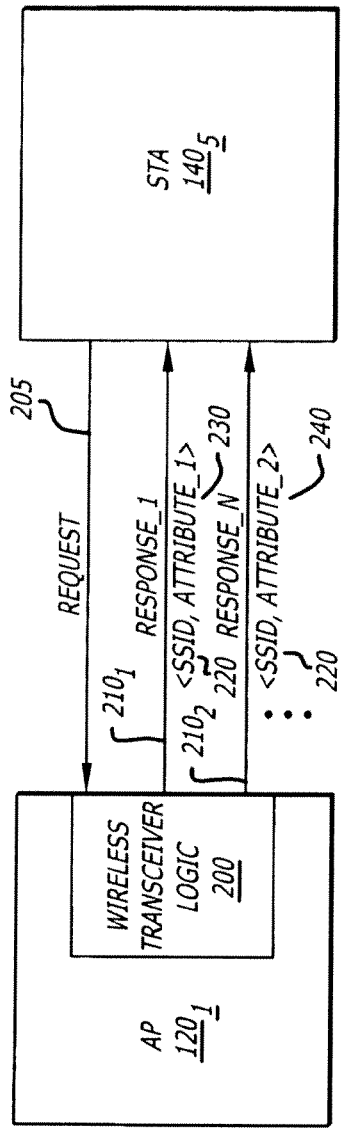
FIG. 2 is an exemplary embodiment of the advertising of BSS services from one wireless device (AP) to another wireless device (STA).

More specifically, as shown in FIG. 2, APs $120_1$ includes wireless transceiver logic 200 that is adapted to receive messages and transmit messages that are formatted to advertise services associated with different BSSs. Each message may include a BSSID corresponding to the particular BSS along with the same SSID. Although not shown, wireless transceiver logic 200 may include, but is not limited or restricted to an antenna, a tuner, a processor such as a microprocessor, digital signal processor, microcontroller, or any component adapted to recover information from incoming messages and to formulate outgoing messages, a memory to temporarily store the information, or the like.

As an illustrative example, when a new STA (e.g., STA $140_5$) requests access to one of BSSs $110_1$-$110_N$ forming ESS 100 by transmitting a Request 205, AP $120_1$ returns "N" Probe Responses $210_1$-$210_N$ depending on the number of BSSs $110_1$-$110_N$ associated with ESS 100 of FIG. 1. Presuming N=2 for illustration purposes, AP $120_1$ generates a first Response $210_1$ and a second Response $210_2$. First Response $210_1$ includes an SSID 220 of ESS 100 and at least one other attribute 230 of BSS1 $110_1$. Second Response $210_2$ includes the same SSID 220, but also includes an attribute 240 of BSS2 $110_2$.

Figure 3:
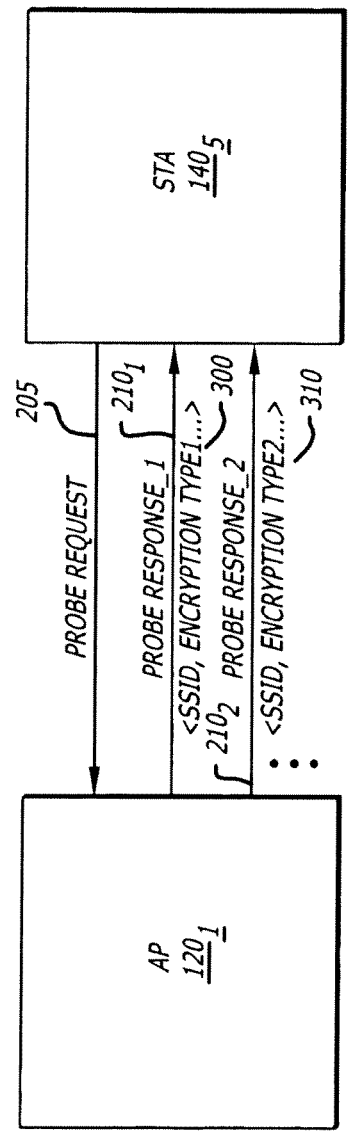
FIG. 3 is an exemplary embodiment of the advertising of BSS services including its encryption attribute from one wireless device (AP) to another wireless device (STA).

For instance, as shown in FIG. 3, the advertisement may involve the exchange of Probe Request and Probe Response messages. Within first Probe Response message $210_1$, attribute 230 of BSS1 $110_1$ may be a first encryption profile 300 identifying that BSS1 $110_1$ supports Wired Equivalent Privacy (WEP) encryption. In contrast, attribute 240 of BSS2 $110_2$ within second Probe Response message $210_2$ may be a second encryption profile 310 identifying a different type of encryption scheme that is supports, such as WPA or WPA2.

II. Single SSID, Multiple BSSID Advertisements

Herein, the term "first wireless device" is considered to be a device with wireless communication capabilities optionally operating in concert with network switch 150 of FIG. 1. For instance, an Access Point (AP) may constitute the first wireless device and optionally operates with network switch 150 to respond to messages from other wireless devices.

Figure 4:
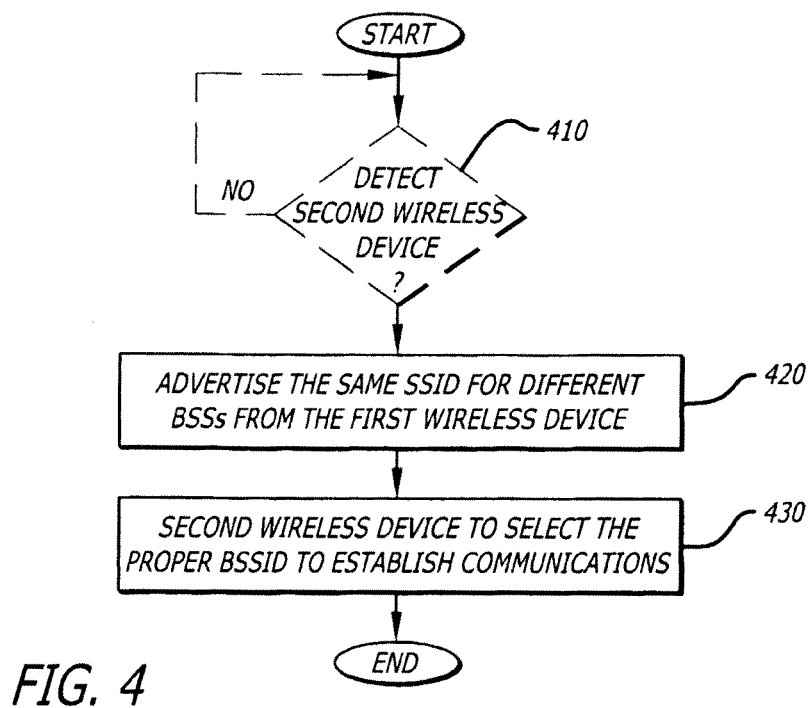
FIG. 4 is an exemplary embodiment of the operations for advertising and selecting services of a BSS.

Referring to FIG. 4, an exemplary embodiment of the operations for advertising and selecting services of a BSS is shown. For this embodiment of the invention, as optionally illustrated in block 410, a first wireless device detects a second wireless device such as an AP detecting a new STA within its coverage area for example. Such detection may be through receipt of a Probe Request frame from the second wireless device such as wireless stations (STAs) for example.

The first wireless device advertises services provided by different BSSs but having the same SSID (block 420). For instance, using an illustrative example, the AP transmits multiple messages, each including the same SSID but different BSSIDs. Upon receipt and processing of these messages, the second wireless device selects one of the BSSIDs to establish communications and become a member of the associated BSS (block 430).

Figure 5:
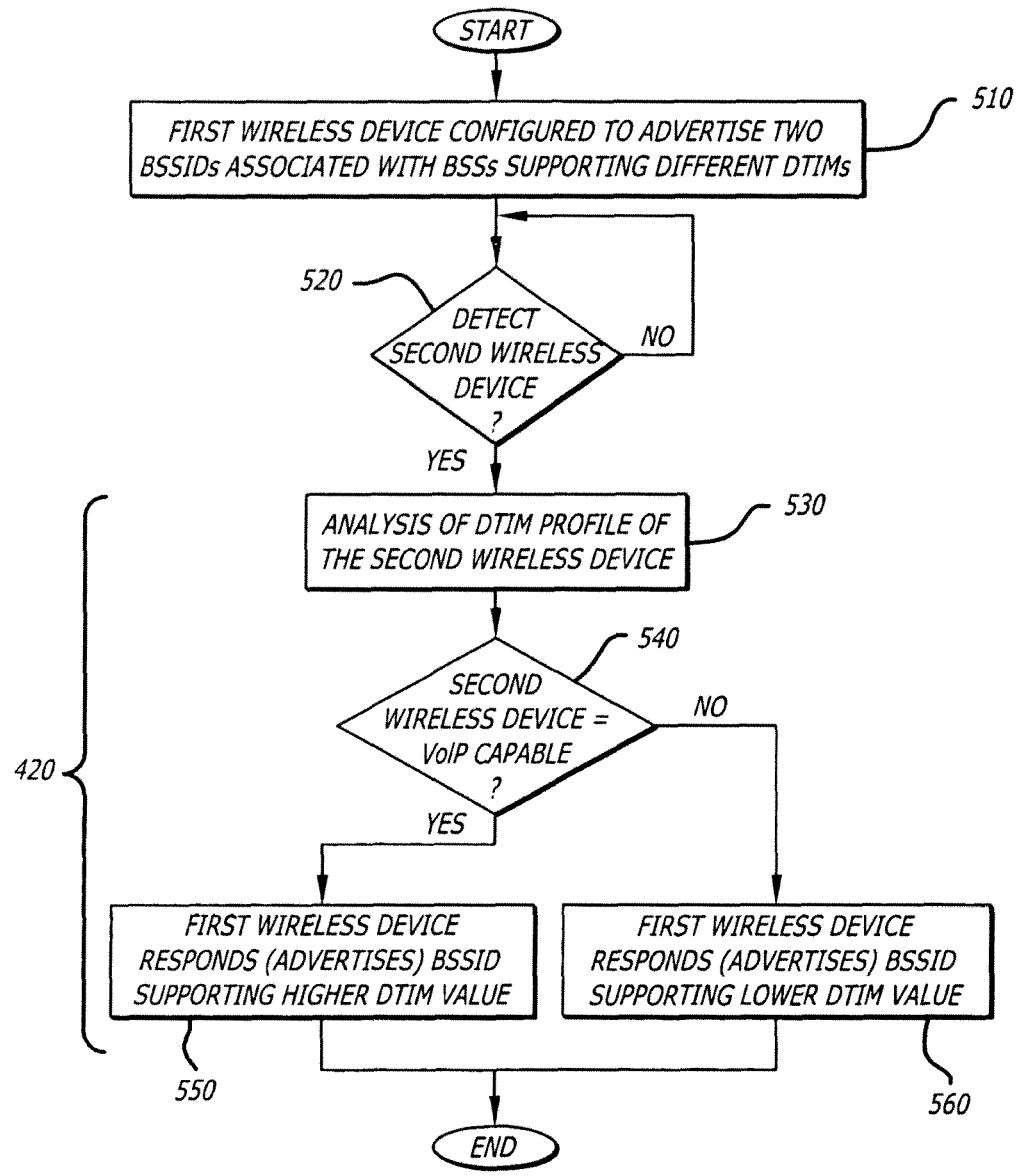
FIG. 5 is an exemplary embodiment of operations of intelligent VoIP support through the advertising of different DTIMs.

Referring to FIG. 5, an exemplary embodiment of operations of intelligent VoIP support through the advertising of different DTIMs is shown. These operations correspond to the advertisement of BSS services and selection as illustrated in blocks 420 and/or 430 of FIG. 4.

As shown in block 510, the first wireless device is configured to advertise two BSSIDs each with different DTIMs through beacons for example. At some point thereafter, as shown in block 520, the first wireless device detects the second wireless device (e.g., STA with VoIP capabilities referred to as "VoIP STA"). Such detection may be through receipt of a Probe Request frame from VoIP STA for example. This Probe Request would include a DTIM profile, which indicates whether the second wireless device is a voice-based device such as a VoIP capable device (e.g., VoIP telephone).

Upon the second wireless device being identified as a VoIP capable device through analysis the DTIM profile by the first wireless device, the first wireless device hides the BSSID with the lower DTIM by responding only with a Probe Response message including the BSSID associated with the higher DTIM value (blocks 530, 540 and 550). Of course, if the wireless network features three or more BSSs each with different DTIMs, it is contemplated that the BSSID associated with the highest DTIM may be transmitted or the BSSID associated with an intermediary DTIM value may be transmitted if other attributes determine that the second wireless device should become a member to that BSS.

If the second wireless device is identified as a data device, the first wireless device hides the BSSID with the higher DTIM by responding only with a Probe Response message including the BSSID associated with the lower DTIM value (blocks 530, 540 and 560). Similarly, if the wireless network features three or more BSSs each with different DTIMs, it is contemplated that the BSSID associated with the lowest DTIM may be transmitted or the BSSID associated with an intermediary DTIM value may be transmitted if other attributes determine that the second wireless device should become a member to that BSS.

As an alternative embodiment, although not shown, it is contemplated that the first wireless device may be configured to transmit multiple Probe Requests with a first Probe Response including the BSSID associated with a DTIM having a predetermined value and a second Probe Response including a BSSID associated with a DTIM having a value higher than the predetermined value. Hence, the second wireless device is responsible for selecting which BSSID to associate with and the DTIM profile would not need to be provided in the Probe Request from the second wireless device.

Figure 6:
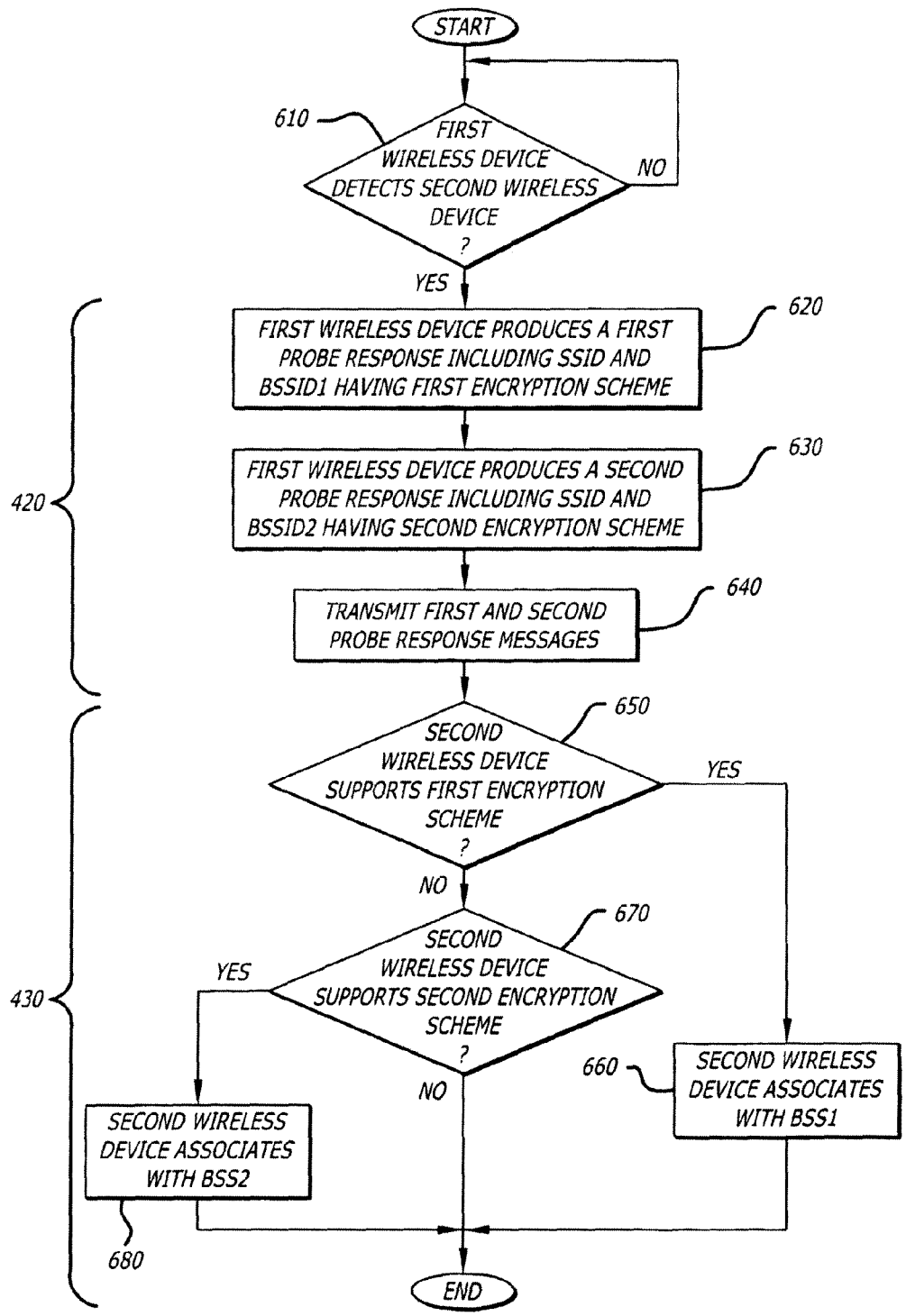
FIG. 6 is an exemplary embodiment of operations of BSS association based on computations by the second wireless device.

Referring now to FIG. 6, an exemplary embodiment of operations of BSS association based on computations by the second wireless device is shown. As shown, the first wireless device is configured to advertise a plurality of BSSIDs each associated with the same SSID but having different encryption schemes for example. More specifically, as shown in block 610, the first wireless device detects the second wireless device. Such detection may be through receipt of a Probe Request frame from the second wireless device for example.

In response, the first wireless device transmits a Probe Response for each BSS associated with the plurality of BSSIDs. For instance, where two BSSs are supported as shown, the first wireless device produces a first Probe Response including the ESSID and a first BSSID (BSSID1) associated with a first encryption scheme (block 620). The first encryption scheme may be no encryption, Wired Equivalent Privacy (WEP), WPA, WPA2 or the like. In addition, the first wireless device produces a second Probe Response including the same SSID and a second BSSID (BSSID2) associated with a second encryption scheme, where the second encryption scheme differs from the first encryption scheme (block 630). The first and second Probe Responses are transmitted from the first wireless device (block 640).

Upon receipt by the second wireless device, a determination is made whether the second wireless device supports the first encryption scheme or the second encryption scheme (block 650). If the second wireless device supports the first encryption scheme, it associates with the first BSSID (block 660). However, if the second wireless device supports the second encryption scheme, it associates with the second BSSID (blocks 670 and 680). In the unlikely event that the second wireless device supports both encryption schemes, it may be adapted to select the BSSID having the most secure encryption scheme. Normally, however the second wireless device will be adapted with one encryption profile.

Figure 7:
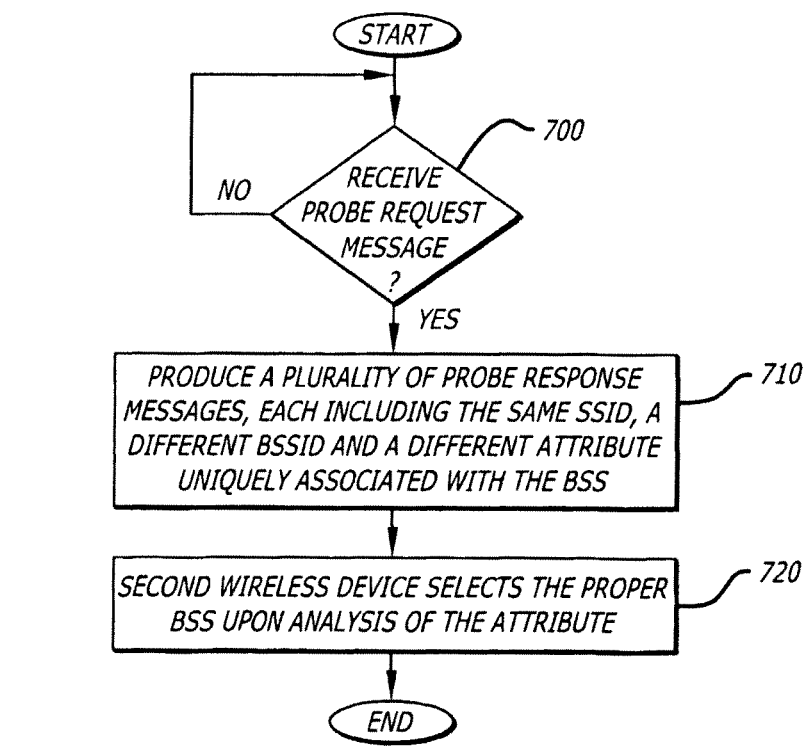
FIG. 7 is an exemplary embodiment of the operations for advertising and selecting services based on an attribute for a BSS excluding the SSID.

Referring now to FIG. 7, an exemplary embodiment of the operations for advertising and selecting services based on an attribute for a BSS excluding the SSID is shown. For this embodiment of the invention, a first wireless device detects a second wireless device such as an AP detecting a new STA within its coverage area for example (block 700). Such detection may be through receipt of a Probe Request message from the second wireless device.

In response, the first wireless device advertises services provided by different BSSs but having the same SSID (block 710). Such advertisement involves the formulation of a plurality of Probe Response message for each BSS supported by the first wireless device. Each Probe Response message includes the same SSID, a different BSSID and a different attribute uniquely associated with the BSS corresponding to the BSSID.

For instance, as described in FIG. 5, the unique attribute may be a particular DTIM value (DTIM1<DTIM2, etc.) so that voice-based wireless devices placing priority on battery conservation associated with the BSS having the higher DTIM value (DTIM2). For other devices where battery conservation is less of a priority, these devices may associated with the BSS having the lower DTIM value (DTIM1). migration from weaker to stronger encryption schemes.

As another illustrative example, as described in FIG. 6, the unique attribute may be a particular encryption scheme (none, WEP, WPA, WPA2, etc) to enable easy migration from weaker to stronger encryption schemes.

Thereafter, as shown in block 720 of FIG. 7, the second wireless device selects the proper BSS upon analysis of the attribute.

While the invention has been described in terms of several embodiments, the invention should not limited to only those embodiments described, but can be practiced with modification and alteration within the spirit and scope of the appended claims. The description is thus to be regarded as illustrative instead of limiting.

The invention claimed is:

1. A non-transitory computer readable storage medium comprising instructions which, when executed by one or more processors, causes performance of operations comprising:
   obtaining information for a wireless device;
   selecting, based at least on the information for the wireless device, a first Access Point (AP) to provide services to the wireless device, the first AP using a first Basic Service Set (BSS), the first AP being selected from a plurality of APs, the plurality of APs comprising a second AP different than the first AP, the second AP using a second BSS different than the first BSS, and wherein the first BSS and the second BSS are represented by a same Service Set Identifier (SSID);
   advertising the services provided by the first AP to the wireless device.

2. The computer readable storage medium of claim 1, wherein advertising comprises transmitting a message comprising the SSID and a unique identifier for the first AP.

3. The computer readable storage medium of claim 1, wherein the first AP is selected based at least on the information for the wireless device and a first attribute value associated with the first AP.

4. The computer readable storage medium of claim 3, wherein the first attribute value comprises a Delivery Traffic Indication Message (DTIM) value.

5. The computer readable storage medium of claim 1, wherein the information for the wireless device comprises an indication of whether the wireless device is Voice-Over-IP capable.

6. The computer readable storage medium of claim 1, wherein the information for the wireless device comprises an encryption scheme supported by the wireless device.

7. The computer readable storage medium of claim 1, wherein the information for the wireless device comprises a configuration of the wireless device associated with battery conservation.

8. The computer readable storage medium of claim 1, wherein the first AP is selected based at least on the information for the wireless device, a first attribute value associated with the first AP, and a second attribute value associated with the second AP in the plurality of APs.

9. The computer readable storage medium of claim 1, wherein the operations further comprise causing the wireless device to associate with the first AP in the plurality of APs.

10. The computer readable storage medium of claim 1, wherein the operations further comprise configuring only the first AP of the plurality of APs to provide services to the wireless device.

11. A non-transitory computer readable storage medium comprising instructions which, when executed by one or more processors, causes performance of operations comprising:
   obtaining information for a wireless device;
   selecting, based at least on the information for the wireless device, a first Access Point (AP) to provide services to the wireless device, the first AP using a first Basic Service Set (BSS), the first AP being selected from a plurality of APs, the plurality of APs comprising a second AP different than the first AP, the second AP using a second BSS different than the first BSS, and wherein the first BSS and the second BSS are represented by a same Service Set Identifier (SSID);
   configuring the plurality of APs such that (a) the first AP is configured for providing the services to the wireless device and (b) APs other than the first AP are configured for not providing the services to the wireless device.

12. The computer readable storage medium of claim 11, wherein the first AP is selected based at least on the information for the wireless device and a first attribute value associated with the first AP.

13. The computer readable storage medium of claim 11, wherein the first AP is selected based at least on the information for the wireless device, a first attribute value associated with the first AP, and a second attribute value associated with the second AP in the plurality of APs.

14. A system comprising:
   at least one device including a hardware processor;
   the system configured to perform operations comprising:
   obtaining information for a wireless device;
   selecting, based at least on the information for the wireless device, a first Access Point (AP) to provide services to the wireless device, the first AP using a first Basic Service Set (BSS), the first AP being selected from a plurality of APs, the plurality of APs comprising a second AP different than the first AP, the second AP using a second BSS different than the first BSS, and wherein the first BSS and the second BSS are represented by a same Service Set Identifier (SSID);
   advertising the services provided by the first AP to the wireless device.

15. The system of claim 14, wherein advertising comprises transmitting a message comprising the SSID and a unique identifier for the first AP.

16. The system of claim 14, wherein the first AP is selected based at least on the information for the wireless device and a first attribute value associated with the first AP.

17. The system of claim 16, wherein the first attribute value comprises a Delivery Traffic Indication Message (DTIM) value.

18. The system of claim 14, wherein the information for the wireless device comprises an indication of whether the wireless device is Voice-Over-IP capable.

19. The system of claim 14, wherein the information for the wireless device comprises an encryption scheme supported by the wireless device.

20. The system of claim 14, wherein the information for the wireless device comprises a configuration of the wireless device associated with battery conservation.

21. The system of claim 14, wherein the first AP is selected based at least on the information for the wireless device, a first attribute value associated with the first AP, and a second attribute value associated with the second AP in the plurality of APs.

22. The system of claim 14, wherein the operations further comprise causing the wireless device to associate with the first AP in the plurality of APs.

23. The system of claim 14, wherein the operations further comprise configuring only the first AP of the plurality of APs to provide services to the wireless device.

24. A system comprising:
   at least one device including a hardware processor;
   the system configured to perform operations comprising:
   obtaining information for a wireless device;
   selecting, based at least on the information for the wireless device, a first Access Point (AP) to provide services to the wireless device, the first AP using a first Basic Service Set (BSS), the first AP being selected from a plurality of APs, the plurality of APs comprising a second AP different than the first AP, the second AP using a second BSS different than the first BSS, and wherein the first BSS and the second BSS are represented by a same Service Set Identifier (SSID);

configuring the plurality of APs such that (a) the first AP is configured for providing the services to the wireless device and (b) APs other than the first AP are configured for not providing the services to the wireless device.

25. The system of claim 24, wherein the first AP is selected based at least on the information for the wireless device and a first attribute value associated with the first AP.

26. The system of claim 24, wherein the first AP is selected based at least on the information for the wireless device, a first attribute value associated with the first AP, and a second attribute value associated with the second AP in the plurality of APs.

* * * * *